(12) United States Patent
Svrcek (10) Patent No.: US 10,669,969 B2
(45) Date of Patent: *Jun. 2, 2020

(54) OPEN-FACED PISTON ASSEMBLY

(71) Applicant: EtaGen, Inc., Menlo Park, CA (US)

(72) Inventor: Matt Svrcek, Redwood City, CA (US)

(73) Assignee: Mainspring Energy, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/452,500

(22) Filed: Jun. 25, 2019

(65) Prior Publication Data

US 2019/0316543 A1    Oct. 17, 2019

Related U.S. Application Data

(63) Continuation of application No. 15/820,240, filed on Nov. 21, 2017, now Pat. No. 10,359,002, which is a
(Continued)

(51) Int. Cl.
| | | |
|---|---|---|
| *F16J 1/09* | (2006.01) | |
| *F16J 9/08* | (2006.01) | |
| *F02B 71/00* | (2006.01) | |
| *F02F 3/28* | (2006.01) | |
| *F16J 1/00* | (2006.01) | |
| *F16J 9/12* | (2006.01) | |

(52) U.S. Cl.
CPC ............... *F02F 3/28* (2013.01); *F02B 71/00* (2013.01); *F16J 1/001* (2013.01); *F16J 1/09* (2013.01); *F16J 9/08* (2013.01); *F16J 9/12* (2013.01)

(58) Field of Classification Search
CPC ...... F02B 63/04; F02B 63/041; F02B 75/282; F02B 71/00; F02F 3/28; F02F 3/24; F16J 1/001; F16J 1/09; F16J 9/00; F16J 9/08; F16J 9/12; Y10S 277/926
USPC .......................... 92/182; 123/193.4; 277/467
See application file for complete search history.

(56) References Cited

U.S. PATENT DOCUMENTS

| 1,467,256 A | 9/1923 | Thomson |
|---|---|---|
| 1,523,572 A | 1/1925 | Agard |
| (Continued) | | |

FOREIGN PATENT DOCUMENTS

| FR | 454542 | 7/1913 | |
|---|---|---|---|
| FR | 454542 A | * 7/1913 | ................ F02F 3/28 |
| (Continued) | | | |

OTHER PUBLICATIONS

Human English Translation of FR-454542-A (Year: 2018).*
(Continued)

*Primary Examiner* — Jacob M Amick
*Assistant Examiner* — Michael A Kessler
(74) *Attorney, Agent, or Firm* — Haley Guiliano LLP (57) ABSTRACT

The present disclosure provides an open-faced piston with a circumferential groove into which a piston ring assembly is arranged. Openings at the bottom of the circumferential groove and between a front land of the open-faced piston and the piston face are provided. The openings are arranged to allow for a combustion reaction to propagate through the volume defined between the bottom of the piston ring assembly and the piston face such that at least a portion of an air and fuel mixture located in that volume is reacted.

13 Claims, 7 Drawing Sheets

Related U.S. Application Data continuation of application No. 15/294,438, filed on Oct. 14, 2016, now Pat. No. 9,856,821.

(56) References Cited

U.S. PATENT DOCUMENTS

| | | | |
|---|---|---|---|
| 1,936,430 A | 11/1933 | Godron | |
| 1,963,151 A | 6/1934 | Russell | |
| 2,170,970 A | 8/1939 | Johnston | |
| 2,356,909 A | 8/1944 | Aske | |
| 2,610,098 A * | 9/1952 | Reiners | F16J 9/08 277/449 |
| 3,526,298 A | 9/1970 | Sann | |
| 3,656,414 A * | 4/1972 | Muller | F04B 39/042 92/249 |
| 4,104,989 A | 8/1978 | Resler | |
| 5,106,208 A * | 4/1992 | Bobo | F01D 25/164 29/898.1 |
| 6,659,063 B2 | 12/2003 | Nomura et al. | |
| 7,004,140 B2 | 2/2006 | Kim | |
| 9,856,821 B1 * | 1/2018 | Svrcek | F02F 3/28 |
| 10,359,002 B2 * | 7/2019 | Svrcek | F02F 3/28 |
| 2004/0237775 A1 | 12/2004 | Dunaevsky et al. | |
| 2009/0151688 A1 | 6/2009 | Matsui et al. | |
| 2015/0240943 A1 | 8/2015 | Meacham | |

FOREIGN PATENT DOCUMENTS

| | | | |
|---|---|---|---|
| FR | 468830 | 7/1914 | |
| FR | 468830 A * | 7/1914 | F16J 9/08 |
| GB | 190922708 | 4/1910 | |
| JP | 57140966 | 8/1982 | |
| JP | S5868546 | 4/1983 | |
| MD | 4134 | 10/2011 | |
| WO | WO 9937941 | 7/1999 | |

OTHER PUBLICATIONS

English Machine Translation Provided by Espacenet of FR-468830-A (Year: 2019).*

Ducarme et al., "Progress in Combustion Science and Technology: International Series of Monographs in Aeronautics and Astronautics", vol. 1 Elsevier, 2014.

International Search Report and Written Opinion of the International Searching Authority for application No. PCT/US2017/056669 dated Jan. 23, 2018.

* cited by examiner

OPEN-FACED PISTON ASSEMBLY

The present disclosure is directed towards a piston and, more particularly, the present disclosure is directed towards a piston assembly having an open face for reducing unburned hydrocarbon emissions. This application is a continuation of U.S. patent application Ser. No. 15/820,240 filed on Nov. 21, 2017, which is a continuation of U.S. patent application Ser. No. 15/294,438 filed on Oct. 14, 2016, the contents of which are incorporated by reference herein in their entireties.

BACKGROUND

In a conventional combustion engine, a piston reciprocates inside of a cylinder, compressing and expanding a gas mixture. In certain types of engines, the compressed gas is a mixture of fuel and air. This results in a specific problem in which the fuel and air mixture occupies volumes between the piston and the cylinder and between a piston surface and a ring of the piston, referred to as "crevice volumes." Because the surface area to volume ratio of these spaces is high, the fuel and air mixture in a crevice volume is cooled to a low enough temperature such that all intended chemical reactions do not take place and the fuel is not burned during a combustion phase. This unburned fuel is then exhausted from the engine, resulting in hydrocarbon emissions as well as reduced efficiency.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

The present disclosure is applicable towards any type of combustion engine, compressor, or pump having a cylinder with a fuel and an oxidizer mixture, a piston that reciprocates within the cylinder, and a piston ring that separates a high pressure in front of the ring from a lower pressure at the back of the ring. For purposes of brevity and clarity, the present disclosure will be described herein in the context of a combustion engine. It will be understood, however, that the features disclosed herein can be implemented in the context of any other suitable device, including, for example, a compressor or pump. In some embodiments, the present disclosure can be implemented in a crankshaft-based engine, which typically relies on oil to lubricate potential piston and cylinder and/or piston ring and cylinder contact points, though the present disclosure can be implemented in crankshaft-based engines in which no oil is used. In some embodiments, the present disclosure can be implemented in a free-piston engine, such as a linear free-piston engine, in which one or more pistons reciprocate within one or more cylinders free of any mechanical linkages. Free-piston engines may be operated with or without oil for lubrication. Some examples of free-piston engines are shown in commonly assigned U.S. Pat. No. 8,662,029, issued Mar. 4, 2014 and U.S. Patent Application Publication No. 2016/0208686A1, filed Jan. 15, 2015, both of which are hereby incorporated by reference herein in their entireties. For purposes of illustration, and not by way of limitation, the oxidizer used in the above-referenced fuel and oxidizer mixture will be described as being air. It will be understood that any other suitable oxidizer can be used in the mixture, including any suitable gas in addition to or in place of air, any other suitable fluid, or any combination thereof.

Figure 1:
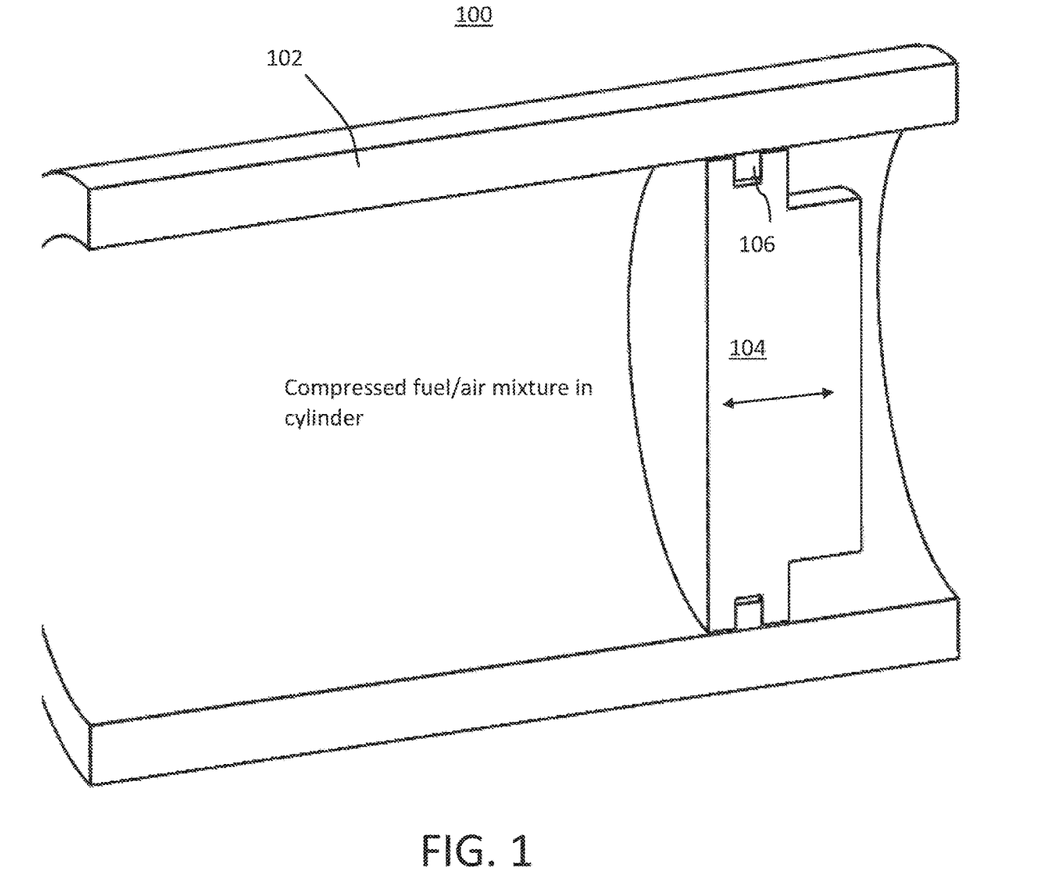
FIG. 1 shows a cross-sectional perspective view of a portion of an illustrative engine in accordance with some embodiments of the present disclosure.
Figure 2:
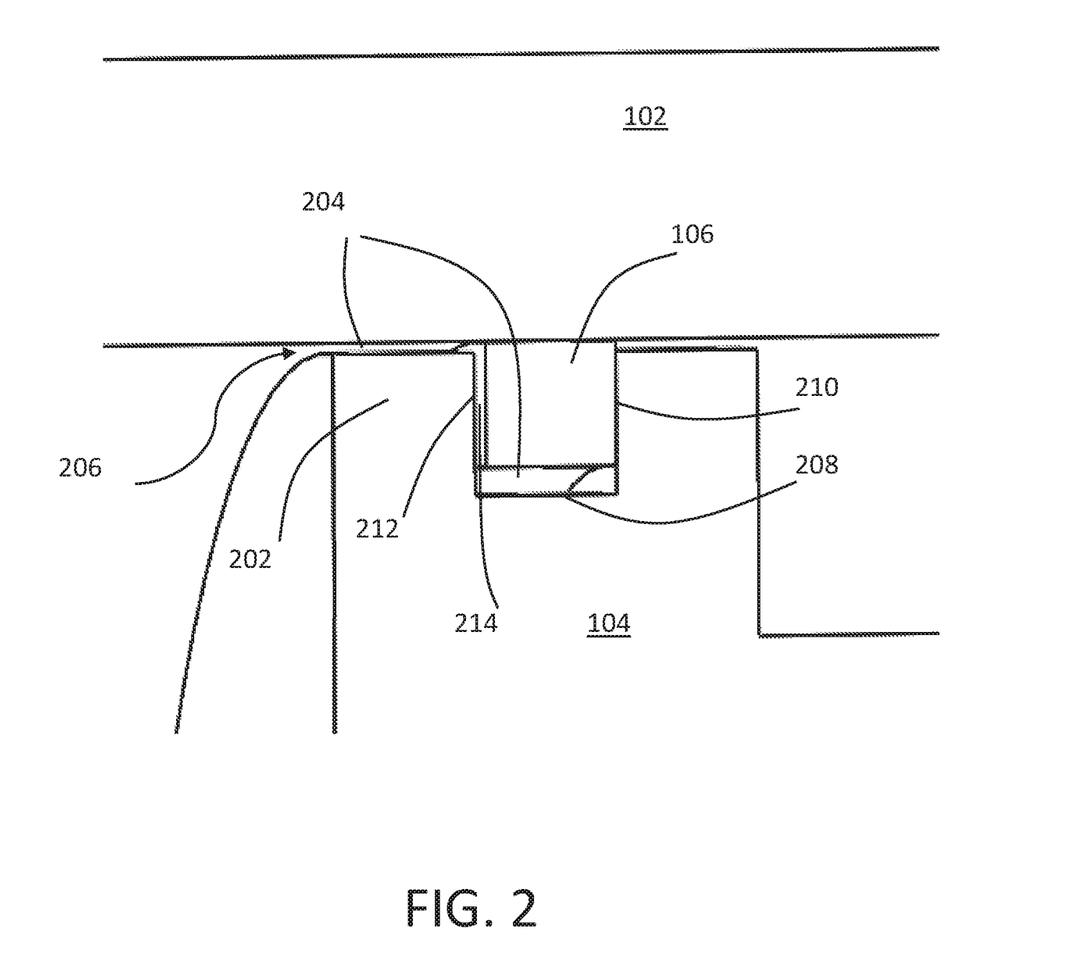
FIG. 2 is a close up cross-sectional elevation view of a portion of the illustrative engine of FIG. 1.

FIG. 1 shows a cross-sectional perspective view of a portion of an illustrative engine 100 in accordance with some embodiments of the present disclosure. Within cylinder 102 is reciprocating piston 104, including piston ring 106 (also referred to as a sealing ring) arranged in a circumferential groove of piston 104. FIG. 2 is a close up cross-sectional elevation view of a portion of engine 100 showing volumes 204 in between a front land 202 of piston 104 and the inner surface of cylinder 102 as well as in between the inner surface of piston ring 106 and the outer surface of piston 104. Front land 202 is the front facing portion of piston 104 and defines the front side 212 of the circumferential groove in which piston ring 106 is arranged. The circumferential groove is further defined by the illustrated bottom side 208 and back side 210. Volumes 204 make up respective crevice volumes into which fuel and air mixture 206 travels. In a combustion engine, such as in engine 100, when a combustion reaction attempts to propagate through a small volume, such as through crevice volumes 204, heat transfer out of the hot gases into the cylinder, piston surfaces, and ring cools the fuel and air mixture. If the rate of cooling via heat transfer to the surfaces is faster than the rate of energy release from the reaction, then the reaction will quench and stop. As the volume in which the reaction is propagating gets physically smaller, the ratio of surface area to reaction volume gets larger, resulting in greater relative cooling. Below a certain distance between surfaces, it is not possible for the reaction to propagate through the respective volumes at all. This limiting distance is referred to herein as the quench distance. The quench distance is a function of several factors, including, for example, the temperature of the fuel and air mixture, the pressure, type of fuel, the mixture ratio, and the thermal conductivity of the mixture and the material with which it is in contact. For conditions experienced in an internal combustion engine, the quench distance can be, for example, on the order of magnitude of approximately 1 mm ($10^3$ microns). By comparison, the distance between the piston outer surface 202 (i.e., at the front land) and inner surface of the cylinder 102, and between the front surface 214 of piston ring 106 (i.e., facing the front side 212 of the piston's circumferential groove) and the front side 212 of the circumferential groove, is typically on an order of magnitude between $10^1$ microns and $10^2$ microns. Thus, the combustion reaction cannot typically propagate into, for example, the volumes defined in front of piston ring 106 (i.e., between the inner surface of cylinder 102 and the top of front land 202) and below the inner surface of the piston ring (i.e., between the inner surface of piston ring 106 and the surface of piston 104), and at least some of the fuel located there is not burned. It will be understood that certain aspects of the figures, including FIG. 2, are not drawn to scale for purposes of clarity, such as the distance between circumferential groove front side 212 and piston ring front surface 214.

Figure 3:
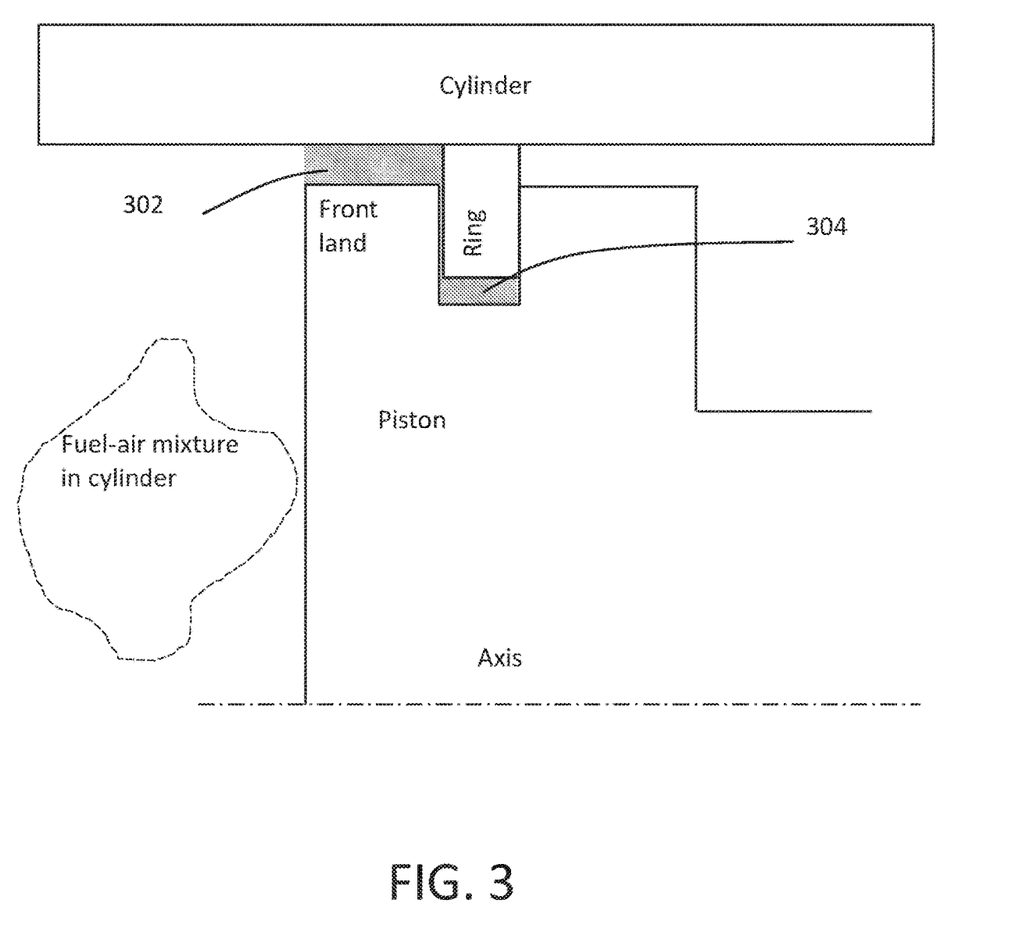
FIG. 3 is an elevation cross-sectional view of an illustrative engine that shows the location of crevice volumes in a typical piston and ring configuration in accordance with some embodiments of the present disclosure.

FIG. 3 is an elevation cross-sectional view of an illustrative engine that shows the location of crevice volumes in a typical piston and ring configuration in accordance with some embodiments of the present disclosure. As illustrated, the crevice volumes, indicated by the shaded volumes 302 and 304, are divided into two locations: between the top land and the inner surface of the cylinder, and between the piston ring and the circumferential groove in which the piston ring is arranged, respectively. The discussion which follows is with respect to this latter volume, volume 304 between the piston ring and the circumferential groove.

Figure 4:
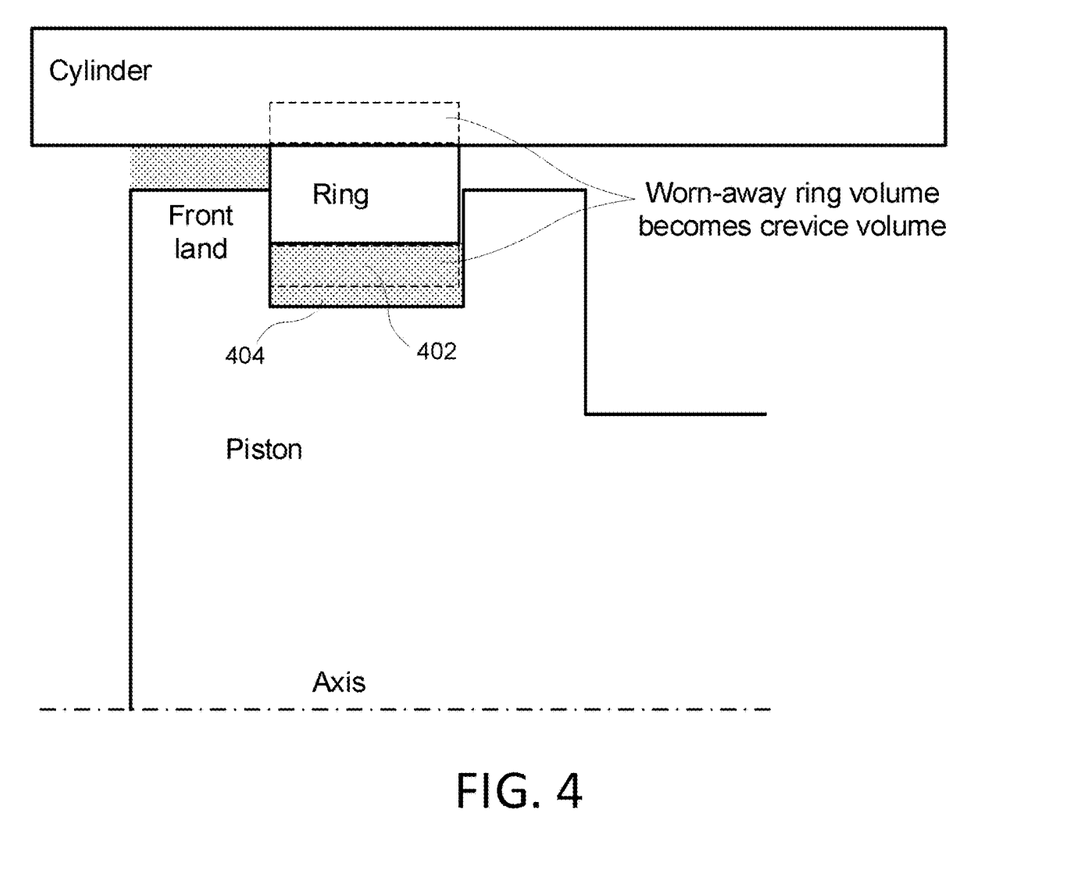
FIG. 4 is an elevation cross-sectional view of another illustrative engine that shows the location of crevice volumes in a typical piston and ring configuration in accordance with some embodiments of the present disclosure.

In a conventional engine, the crevice volume between the sealing ring and the circumferential groove (e.g., volume 304) can be a source of significant hydrocarbon emissions. Certain design choices applicable to an oil-less piston ring design can further exacerbate this issue. Two examples are illustrated in FIG. 4, which shows a particular piston ring design in accordance with some embodiments of the present disclosure. First, in designing an oil-free engine, such as an oil-less free-piston engine, it may be desirable to design an axially thicker piston ring. This would cause the crevice volume between the piston ring and the circumferential groove to be increased. For example, comparing the piston rings shown in FIG. 3 and FIG. 4, it is apparent that the crevice volume 404 is larger in FIG. 4 as compared to crevice volume 304 in FIG. 3 due to the increased axial width of the piston ring used in the design shown in FIG. 4 relative to that of FIG. 3. Second, certain materials used for a piston ring (e.g., carbon graphite, polymers such as polyether ether ketone (PEEK), polytetrafluoroethylene (PTFE) (e.g., Teflon), and Molybdenum disulfide (MoS2)) might wear at a relatively high rate. This might be particularly relevant when, for example, designing an oil-less engine, such as an oil-less free-piston engine, which would typically use a material for the piston ring that wears relatively quickly (when compared to, for example, typical hard-faced oil-lubricated piston rings). As material is removed from the piston ring due to this wear, additional crevice volume 402 between the ring and groove opens up where the ring material used to be. This is illustrated by the dashed lines in FIG. 4, which indicate the worn away portion of the piston ring being replaced with additional crevice volume.

In some embodiments of the present disclosure, the piston face is modified in order to open the volume between the piston ring and the circumferential groove to the cylinder volume. Openings between the piston face and the circumferential groove in which the piston ring is arranged are introduced that allow the combustion reaction to reach the volume between the inner surface of the ring and the circumferential groove. These communicating openings have a characteristic length larger than the quench distance in order to allow the reaction to propagate into the target volume (e.g., where the crevice volumes would be absent the openings) and burn the fuel located there. For example, when the quench distance is 1 mm, the characteristic length of these openings will be greater than 1 mm.

In some embodiments, the front land is necessary in order to contain the piston ring on the piston under the effect of friction and acceleration loads, which could otherwise throw the piston ring away from the ring seating area on the piston. Therefore, a design tradeoff arises in that it is desirable to leave the passage between the front land and the piston face as open as possible to allow complete burning of fuel located between the piston ring and the piston, but also necessary to mechanically attach the front land to the piston with sufficient strength. In some embodiments, this can be achieved using a design as illustrated in FIGS. 5 and 6.

Figure 5:
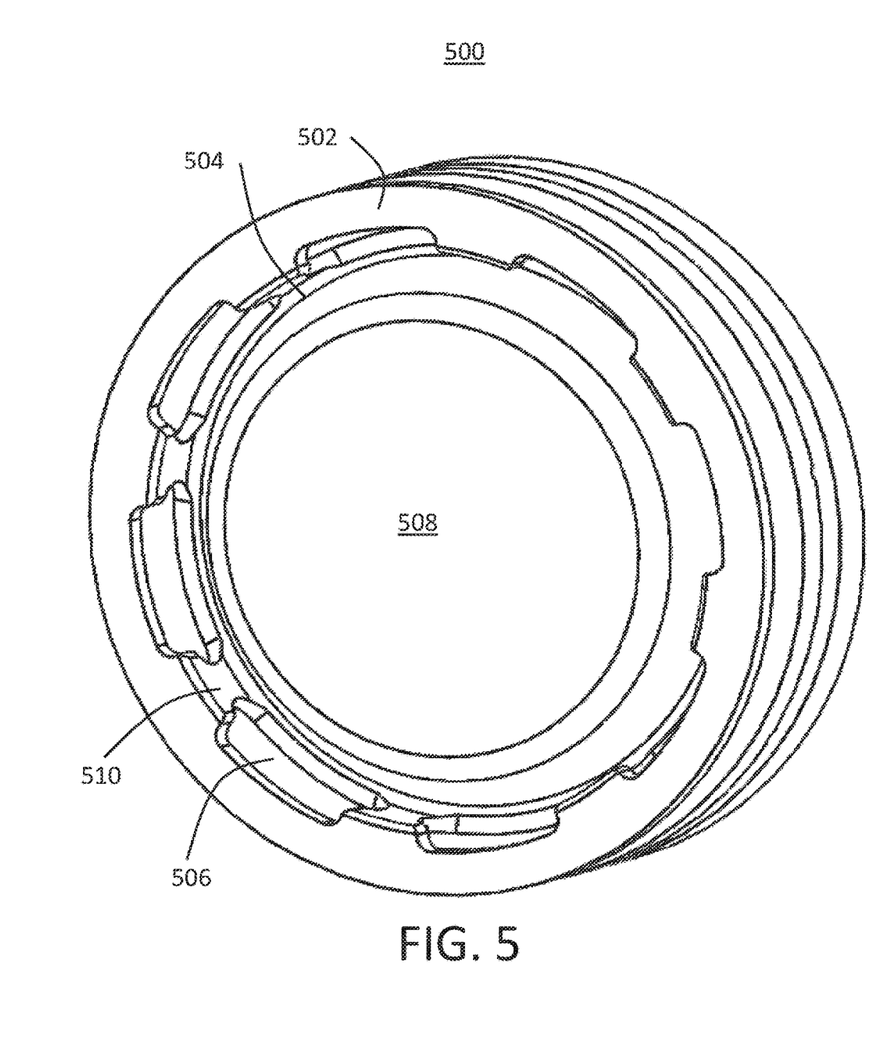
FIG. 5 shows a perspective view of a front portion of an illustrative open-faced piston in accordance with some embodiments of the present disclosure.
Figure 6:
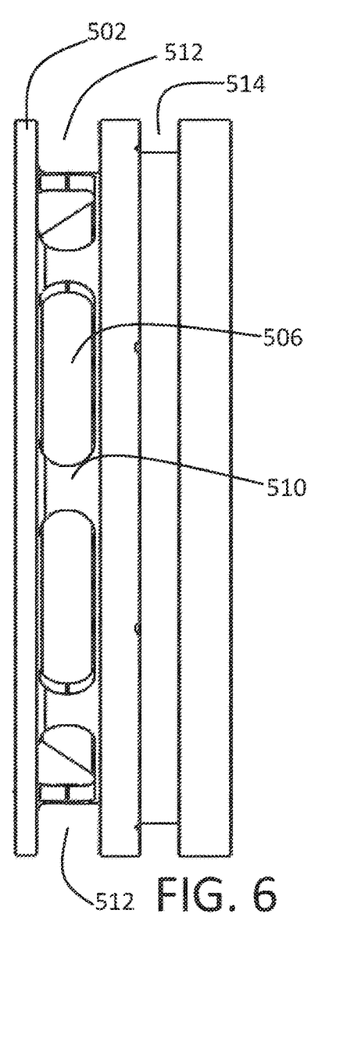
FIG. 6 shows an elevation side view of the open-faced piston of FIG. 5.

FIG. 5 shows a perspective view of a front portion of an illustrative open-faced piston 500 in accordance with some embodiments of the present disclosure. FIG. 6 shows an elevation side view of the open-faced piston of FIG. 5. Whereas in a conventional piston design the surface of a piston face extends fully radially outwards to the edge of the front land, in the design illustrated in FIGS. 5 and 6, the piston face 508 extends radially outward only partially, leaving an opening 504 between itself and front land 502. In addition, in the illustrated design, spaced openings 506 are provided along circumferential groove 512 in which the piston ring would be arranged.

Structural webs 510 are provided in order to attach the front land to the back side of circumferential groove 512. Structural webs 510 also serve to partially define the bottom side of circumferential groove 512. More particularly, the bottom side of circumferential groove 512 is defined by structural webs 510 as well as by spaced openings 506. Openings 504 and 506 are sized and arranged such that a minimum opening along a gas path between each opening and an inner surface of the piston ring assembly is at least a quench distance of the air and fuel mixture. For example, the openings can be sized between 1 mm and 10 mm or even greater (i.e., where the quench distance is less than 1 mm) In other examples, the openings can be sized less than 1 mm so long as the dimensions of the openings are still greater than the quench distance of the air and fuel mixture. It will be understood that the illustrated design is merely exemplary. Any other suitable design that provides openings for allowing a combustion reaction to propagate into the crevice volume defined between the inner surface of a piston ring and the bottom of the circumferential groove may be used in accordance with the principles of the present disclosure. For example, while FIGS. 5 and 6 show openings 506 as being substantially equivalent to one another in terms of geometry and spacing, they need not be. Openings 506 may of any suitable size and shape. They may be all substantially equivalent or, alternatively, one or more of the openings 506 may be different in size, shape, or both relative to one or more of the remaining openings 506. The size and shape of the structural webs 510 between openings 506 (i.e., the spacing and design) can be substantially equivalent to one another, or, alternatively, one or more of structural webs 510 may be different in size, shape, or both relative to one or more of the remaining structural webs 510. In some embodiments, openings 506 may cover a majority of the bottom of circumferential groove 512.

Opening 504, while illustrated as a single symmetrical opening, may, in some embodiments, be implemented as two or more openings having any suitable geometrical properties. For example, in some embodiments, the front face of front land 502 may extend radially inward and connect to piston face 508 to create additional structural webs substantially orthogonal in orientation to illustrated structural webs 510. It will be understood that these additional structural webs need not be substantially orthogonal to illustrated structural webs 510 (i.e., depending on the location of piston face 508 relative to front 502). With this additional structural support, these embodiments might allow for openings 506 to be greater in number, size, or both. In one suitable approach, a single opening may be used in place of multiple openings 506 such that the bottom of the circumferential groove is entirely open. In this approach, at least one structural web either between front land 502 and piston face 508, axially across the bottom of circumferential groove 512, or both would be needed in order to attach front land 502 to the rest of piston 500.

Figure 7:
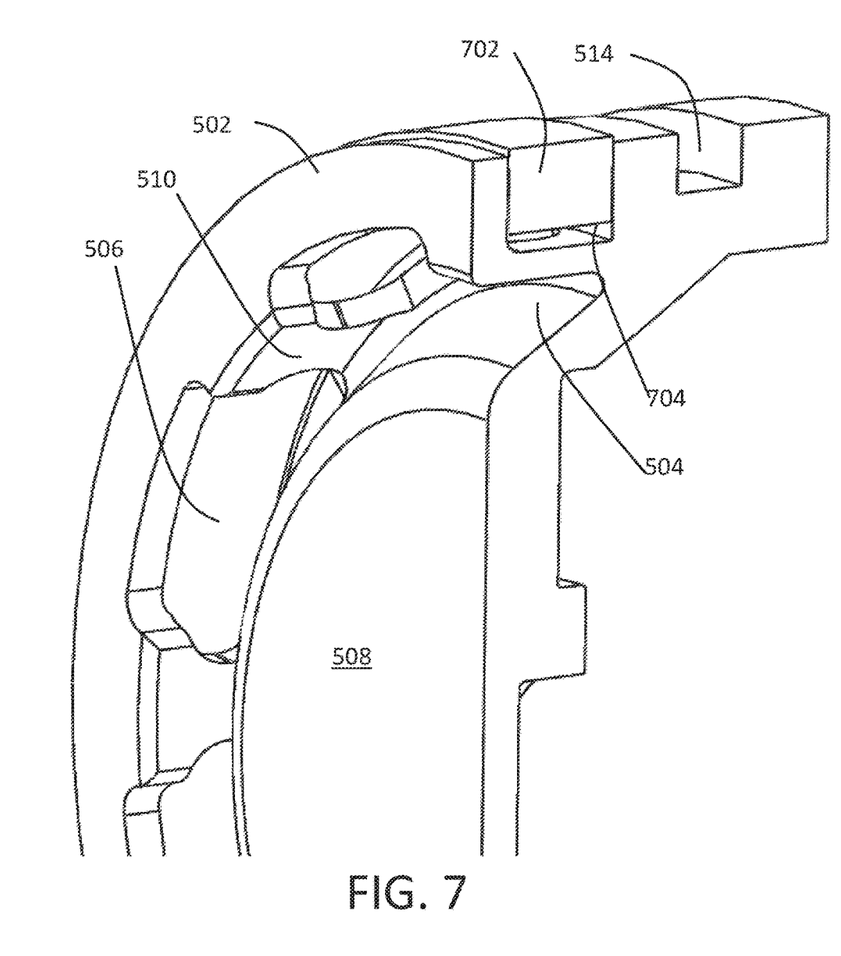
FIG. 7 shows a cross-sectional perspective of a portion of an open-faced piston assembly that includes the open-faced piston of FIGS. 5 and 6 in accordance with some embodiments of the present disclosure.
Figure 8:
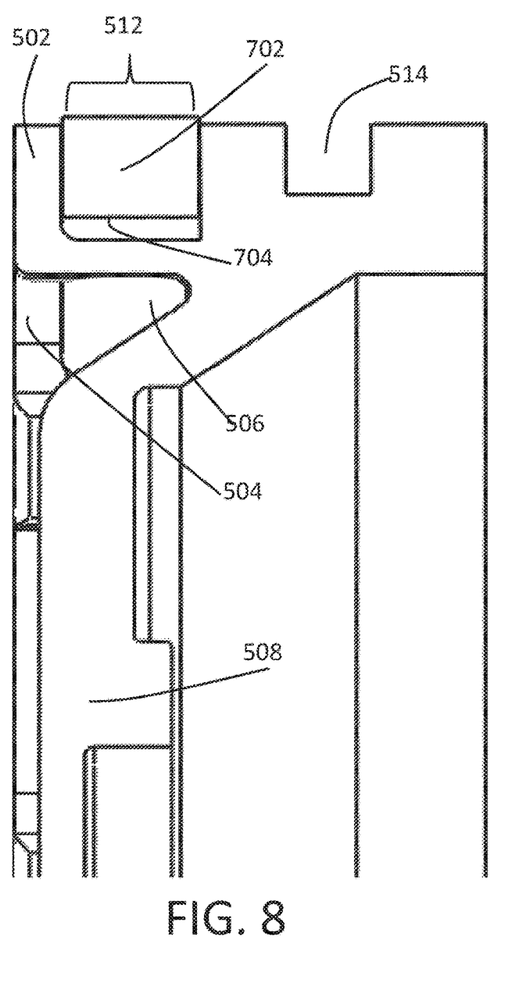
FIG. 8 shows an elevation side view of the open-faced piston assembly of FIG. 7.

FIGS. 7 and 8 show cross-sectional perspective and side elevation views, respectively, of a portion of an open-faced piston assembly that includes the open-faced piston of FIGS. 5 and 6 and piston ring assembly 702 in accordance with some embodiments of the present disclosure. Piston ring assembly 702, having piston ring inner surface 704 is arranged in the circumferential groove and is physically contained in the groove by virtue of front land 502 defining the front side of the groove. At the same time, piston ring inner surface 704 is exposed to the air and fuel mixture in the cylinder over at least a majority of its circumference and axial width. During combustion, the reaction propagates through to at least a portion of piston ring inner surface 704 causing the fuel and air mixture located in the volume defined between piston ring inner surface and piston face 508 to be at least partially reacted. This at least partial reaction causes at least more than a negligible amount of the fuel and air mixture in this volume to be reacted. In some embodiments, the amount of the fuel and air mixture in this volume that is reacted is at least a majority of the fuel and air mixture. In some embodiments, the amount of the fuel and air mixture in this volume that is reacted is at least substantially all of the fuel and air mixture.

Piston ring assembly 702 may include a single continuous piston ring made of any suitable material and dimensions. In some embodiments, piston ring assembly 702 may include two or more portions of a piston ring that are coupled, able to move independently of each other (e.g., in the radial or axial direction), or both. As illustrated, piston ring assembly 702 is a single contiguous ring. The smallest extent of the openings between piston face 508 and front land 502 is greater than 1 mm, ensuring that the fuel and air mixture located between piston ring inner surface 704 and piston 500 is reacted when the quench distance is 1 mm or less. The structural web geometry ensures the front land remains attached to the piston despite cyclic acceleration loads from piston ring 702 pushing forward on front land 502. In some embodiments, piston ring assembly 702 may be made at least partially of a solid lubricating material and used, for example, in the manner illustrated in FIG. 4 without concern of an increasing crevice volume because of the benefit of openings 504 and 506.

In some embodiments, circumferential groove 512 extends around the entirety of the circumference of piston 500. In some embodiments, circumferential groove 512 extends only partially around the circumference of piston 500. Circumferential groove 512 may be a single continuous groove or may be two or more discrete grooves (i.e., each having its own respective piston ring portion) arranged serially around the circumference of piston 500. When circumferential groove 512 includes more than one groove, the multiple grooves, in some embodiments, go entirely around the circumference of piston 500 and may be separated by any suitable distance from each respective facing end. It will be understood that while the present disclosure describes embodiments in which there is a single circumferential groove 512, in some embodiments there may be multiple circumferential grooves that are arranged in parallel axially along the length of piston 500, each of which accommodates a respective piston ring assembly. For example, as illustrated in FIGS. 5-8, an additional circumferential groove 514 is provided that is configured to accommodate an addition piston ring (not shown). Circumferential groove 514 is arranged in parallel to circumferential groove 512 and is located behind circumferential groove 512.

Figure 9:
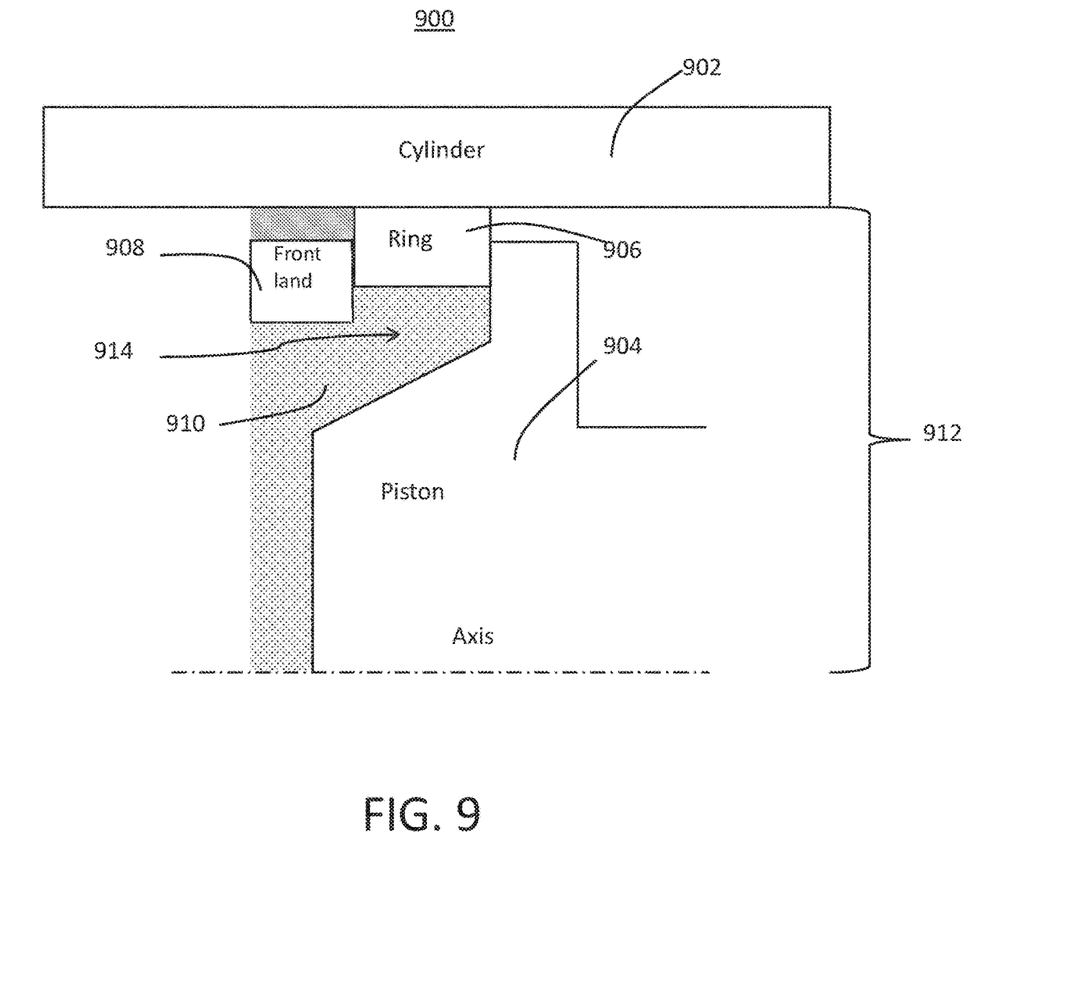
FIG. 9 shows a simplified cross-sectional view of a portion of an engine using an open-faced piston assembly in accordance with some embodiments of the present disclosure.

FIG. 9 shows a simplified cross-sectional view of a portion of an engine 900 using an open-faced piston assembly in accordance with some embodiments of the present disclosure. Piston assembly 912 reciprocates in cylinder 902. Combustion reaction 914 originating from a combustion section of cylinder 902 is able to propagate and react through opening 910 into the volume defined between the inner surface of ring 906 and piston 904. It will be understood, therefore, that the features of the present disclosure provide for a combustion reaction to propagate into this volume. It will further be understood that, while a combustion reaction propagates into the volume defined between the inner surface of ring 906 and piston 904, that not necessarily all of the fuel and air mixture in that volume is reacted, but at least a portion, greater than a negligible portion of the mixture (for example, in some embodiments, at least a majority of the mixture, or at least substantially all of the mixture). Front land 908 is attached to the piston 904 by structural webs (not shown in FIG. 9) and is able to hold ring 906 in place. It will be understood that engine 900 may be implemented using any suitable arrangement. For example, more than one cylinder may be used, more than one piston in one or more cylinders may be used, or any other suitable arrangement may be implemented using the features of the present disclosure.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:
1. A piston assembly comprising:
   a piston configured to be in contact with a combustion section, the piston comprising:

a circumferential groove that extends at least partially around an outer surface of the piston, and a plurality of openings located along the circumferential groove; and a piston ring assembly arranged within the circumferential groove, wherein each of the plurality of openings is sized and arranged such that a minimum opening along a gas path between each opening and the inner surface of the piston ring assembly is larger than a quench distance of an oxidizer and fuel mixture of the combustion section.

2. The piston assembly of claim 1, wherein the piston further comprises a plurality of structural webs arranged between the plurality of openings.

3. The piston assembly of claim 1, wherein the piston further comprises a front land configured to maintain the piston ring assembly within the circumferential groove.

4. The piston assembly of claim 1, wherein the quench distance is approximately 1 mm.

5. The piston assembly of claim 1, wherein a distance between an outer surface of the piston and the inner surface of the piston ring assembly is greater than 1 mm.

6. The piston assembly of claim 1, wherein the piston assembly is configured for oil-less operation.

7. The piston assembly of claim 1, wherein the piston ring assembly comprises a solid lubricating material.

8. The piston assembly of claim 1, wherein the plurality of openings is configured to allow a combustion reaction to propagate into a volume defined between an inner surface of the piston ring assembly and the piston.

9. The piston assembly of claim 8, wherein the combustion reaction propagates from the combustion section of an engine in which the piston assembly is configured to translate.

10. The piston assembly of claim 1, wherein the plurality of openings comprises a plurality of spaced openings along the circumferential groove that comprise a majority of a surface area of a bottom of the circumferential groove.

11. An engine comprising:

a cylinder comprising a combustion section;

a piston assembly arranged within the cylinder, the piston assembly comprising:

an open-faced piston comprising:

a front land, a circumferential groove that extends at least partially around an outer surface of the open-faced piston, the circumferential groove comprising a front side defined by the front land, a piston face, and a plurality of openings located along the circumferential groove and between the front land and the piston face; and a piston ring assembly arranged within the circumferential groove, wherein each of the plurality of openings is sized and arranged such that a minimum opening along a gas path between each opening and the inner surface of the piston ring assembly is larger than a quench distance of an oxidizer and fuel mixture of the combustion section.

12. The engine of claim 11, wherein the quench distance is approximately 1 mm.

13. The engine of claim 11, wherein the plurality of openings is configured to allow a combustion reaction to propagate into a volume defined between an inner surface of the piston ring assembly and the open-faced piston.

\* \* \* \* \*